US006618674B2

United States Patent
Ireland et al.

(10) Patent No.: US 6,618,674 B2
(45) Date of Patent: Sep. 9, 2003

(54) METHOD AND APPARATUS FOR MEASUREMENT ALIGNMENT

(75) Inventors: Peter J. Ireland, Austin, TX (US); Tao Li, Houston, TX (US); Wayne Wright, Round Rock, TX (US); Padmanaban Namasivayam, Austin, TX (US)

(73) Assignee: Schlumberger Technology Corporation, Austin, TX (US)

( * ) Notice: Subject to any disclaimer, the term of this patent is extended or adjusted under 35 U.S.C. 154(b) by 0 days.

(21) Appl. No.: 09/919,421

(22) Filed: Jul. 31, 2001

(65) Prior Publication Data

US 2003/0024305 A1 Feb. 6, 2003

(51) Int. Cl.⁷ .............................. G01V 1/40; E21C 7/06
(52) U.S. Cl. .............................................. 702/6; 367/82
(58) Field of Search ................................. 702/6; 367/27, 367/82

(56) References Cited

U.S. PATENT DOCUMENTS

| | | | |
|---|---|---|---|
| 5,373,481 A | 12/1994 | Orban et al. | 367/82 |
| 5,838,727 A | 11/1998 | Lyon et al. | 375/261 |
| 5,924,499 A * | 7/1999 | Birchak et al. | 175/40 |
| 6,023,441 A | 2/2000 | McDaniel | |
| 6,131,694 A | 10/2000 | Robbins et al. | |
| 6,308,137 B1 * | 10/2001 | Underhill et al. | 702/9 |
| 6,400,646 B1 * | 6/2002 | Shah et al. | 367/82 |
| 6,424,595 B1 * | 7/2002 | Chenin | 367/82 |
| 6,439,046 B1 * | 8/2002 | Kruspe et al. | 73/152.01 |

FOREIGN PATENT DOCUMENTS

| | | |
|---|---|---|
| GB | 2 348 023 A | 9/2000 |
| WO | WO 98/45733 | 10/1998 |

OTHER PUBLICATIONS

International Search Report in PCT/US02/18871 dated Oct. 24, 2002 (7 pages).
"Logging While Drilling," Schlumberger Wireline & Testing, Jun. 1995, pp. 1–1–8–8.

* cited by examiner

*Primary Examiner*—John Barlow
*Assistant Examiner*—Toan M Le
(74) *Attorney, Agent, or Firm*—Pehr B. Jansson; William Batzer; John J. Ryberg

(57) ABSTRACT

A method for aligning measurements of a hostile environment includes synchronizing at least two clocks, wherein at least a first clock is in the hostile environment, measuring characteristics of the hostile environment, aligning time domain curves of the collected measurements, correlating the curves using one or more events recorded by each clock, and correcting the curves by adding one or more time offsets. The offsets may be added to a found resent event or at other locations on the time domain curve. A second clock may be located outside the hostile environment or within a same or similar hostile environment. The collecting the measurements may be taken by a first measurement tool in a first device near the first clock and in at least a second device coupled to a second clock.

26 Claims, 6 Drawing Sheets

METHOD AND APPARATUS FOR MEASUREMENT ALIGNMENT

BACKGROUND OF THE INVENTION

1. Field of the Invention

The present invention is related to a method and apparatus for logging while drilling oil well equipment, and, more particularly, to a method and apparatus for aligning surface and downhole measurements.

2. Description of the Related Art

The exploration for subsurface minerals requires techniques for determining the characteristics of geological formations. Many characteristics, such as the hydrocarbon volume, resistivity, porosity, lithology, and permeability of a formation, may be deduced from certain measurable quantities. Thus, the techniques for determining the measurable quantities must be accurate.

Conventional systems that measure characteristics of geological formations typically use logging while drilling equipment that transmit real-time data from a tool within a borehole to a surface device. Additional measurement data is typically collected from the same sensor or from another sensor in the tool and logged within the tool. After drilling is completed, the measurement data from both the tool and the surface device is typically merged to provide a more complete data set of the characteristics of the geological formation. Typically, the data is merged using a clock located in the tool and a clock located in the surface device, an index in the clock providing merge indicators for combining the data.

The merging of data often introduces errors into the data when events occur to the tool. For example, a tool in a borehole is exposed to very high pressures and inconsistent surroundings that may cause a clock within the tool to stop for a length of time. Thus, although data is recorded, the time period associated with the data may be time shifted. However, the exact length of the disruption is unknown. Existing techniques for determining the length of disruption typically require inefficient, time intensive analysis of the data to correct the errors, and these are generally unsuccessful.

What is needed, therefore, is a system and method for time aligning measurements stored in equipment such as logging while drilling with measurements received by surface devices.

SUMMARY OF THE INVENTION

Accordingly, a method for aligning measurements of a hostile environment includes synchronizing at least two clocks, wherein at least a first clock is in the hostile environment, measuring characteristics of the hostile environment, aligning time domain curves of the collected measurements, correlating the curves using one or more events recorded by each clock, and correcting the curves by adding one or more time offsets. A second clock may be located outside the hostile environment or within a same or similar hostile environment. The collecting the measurements may be taken by a first measurement tool in a first device near the first clock and in at least a second device coupled to a second clock. Further, the collecting the measurements may include transmitting the measurements to the second device via a slow communication channel such as a mud communication channel or a channel with compromised bandwidth. In an embodiment, the first device is within the measurement tool, the first device collecting the measurements via a faster communication channel. In another embodiment, the method includes correlating an event such as one or more of an accurately timed event by each clock and a discovered event recorded by each clock. The hostile environment may include one or more of a borehole environment, an environment with high environment pressures, and an environment wherein clock measurements are subject to error. The measurement tool may include one or more of a sonde, a logging while drilling tool, and a measurement while drilling tool.

In one embodiment, collecting data is performed in at least a first and a second measurement tool wherein the second measurement tool and the first measurement tool provide measurements, the measurements providing data with which to correct the aligning of the curves. The collecting the measurements may include plotting data from the first measurement tool and in a device coupled to a second clock, the plotting showing at least two measurements from a same sensor. The plotting may include determining a value for a characteristic with respect to a time value.

A system for aligning measurements of a hostile environment according to the present invention includes a measurement tool configured to measure characteristics of the hostile environment, the measurement tool including at least a first recording device, at least a first clock coupled to the first recording device, and at least a second clock synchronized to the first clock, the second clock coupled to at least a second recording device, the second recording device configured to receive measurements from the measurement tool. The measurements recorded by at least the first and second recording devices produce time domain curves that are aligned and correlated using one or more events recorded by at least the first and second clocks, and corrected by adding one or more time offsets.

One embodiment is directed to a method for aligning measurements of a hostile environment that includes receiving the measurements recorded by at least a first and a second recording device, wherein at least the first recording device is disposed in the hostile environment, aligning time domain curves of the collected measurements, correlating the curves using one or more events recorded by at least the first and second recording devices, and correcting the curves by adding one or more time offsets.

Another embodiment is directed to a computer program product including an input/output object operable to receive measurements recorded by at least a first and a second recording device, wherein at least the first recording device is disposed in a hostile environment, an alignment object coupled to the input/output object, the alignment object operable to align time domain curves of the collected measurements, a correlation object coupled to the alignment object, the correlation object operable to correlate the curves using one or more events recorded by at least the first and second clocks, and a correction object coupled to the correlation object, the correction object operable to correct the curves by adding one or more time offsets.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
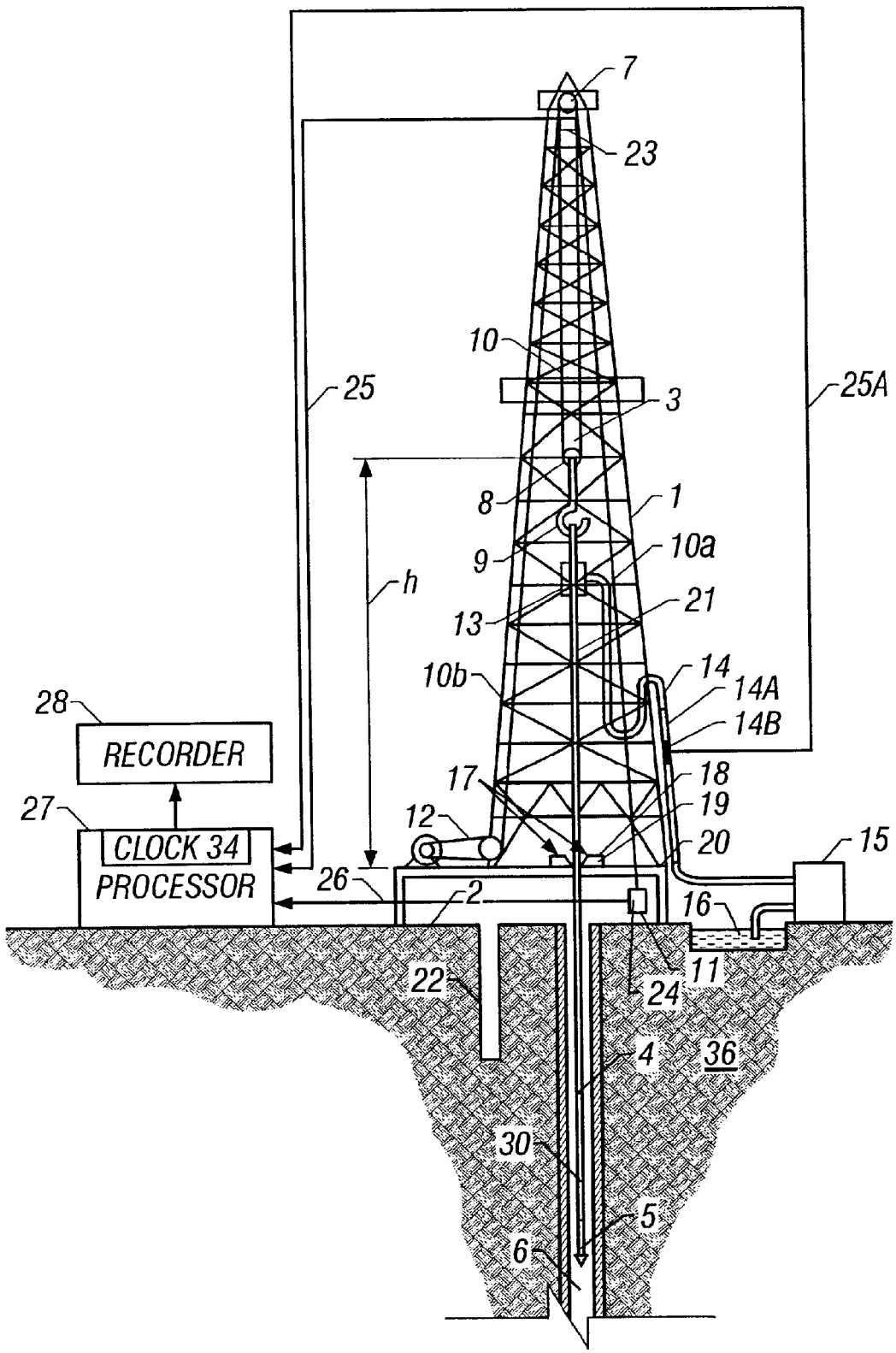
FIG. 1 illustrates a drilling environment appropriate for embodiments of the present invention.

FIG. 1 illustrates a drilling rig and the drill string with a downhole acoustic logging tool for exploring underground geological formation 36. The rotary drilling rig shown includes a mast 1 rising above ground 2 which is fitted with lifting gear 3 from which is suspended drill string 4 formed of drill pipes screwed one to another and having at its lower end drill bit 5 for the purpose of drilling well 6.

Lifting gear 3 includes a crown block 7, the axis of which is fixed to the top of mast 1, vertically traveling block 8, to which is attached hook 9, cable 10 passing round blocks 7 and 8 and forming, from crown block 7, on one hand dead line 10*a* anchored to fixed point 11 and on the other active line 10*b* which winds round the drum of winch 12.

Drill string 4 is suspended from hook 9 by means of swivel 13 linked by hose 14 to mud pump 15, which permits the injection of drilling mud into well 6, via the hollow pipes of drill string 4. Hose 14 is attached to standpipe 14A. Attached to standpipe 14A, one or more sensors 14B receive signals from within the well 6 via mud pulse telemetry. Mud pulse telemetry sensors 14B are coupled via signal line 25A to processor 27. Processor 27 incorporates a clock 34. Accordingly, sensors 14B function as measurement tools for delivering measurements to processor 27 and recorder 28. The drilling mud may be drawn from mud pit 16, which may be fed with surplus mud from well 6. The drill string may be elevated by turning lifting gear 3 with winch 12 and the drill pipes may be successively removed from (or added to) well 6 and unscrewed in order to remove bit 5. These drill pipe raising and lowering operations require drill string 4 to be temporarily unhooked from lifting gear 3; the former is then supported by blocking it with wedges 17 in conical recess 18 in rotating table 19 mounted on platform 20 through which the drill string 4 passes. The lowermost portion of the drill string 4 may contain one or more tools, as shown at 30 for investigating downhole drilling conditions or for investigating the properties of the geological formations penetrated by the bit 5 and borehole 6. Tool 30 is a logging tool capable of logging one or more different types of measurements and includes at least one measurement sensor. Tool 30 may be equipped for logging measurements of resistivity, gamma ray, density, neutron porosities, calipers and photoelectric effect as may be desired. Further, tool 30 may be equipped to include sensors for drilling-related measurements such as direction, inclination and include equipment for data recording and telemetry.

Variations in height h of traveling block 8 during drill string raising operations are measured by means of sensor 23, which may be an angle of rotation sensor coupled to the faster pulley of crown block 7. The weight applied to hook 9 of traveling block 8 may also be measured by means of strain gauge 24 inserted into dead line 10*a* of cable 10 to measure its tension. Sensor 23 and strain gauge 24 are connected by signal lines 25 and 26 to a processor 27 which processes the measurement signals and which incorporates a clock. Recorder 28 is connected to processor 27, which is preferably a computer.

Recorder 28 may receive measurements for a plurality of characteristics of the hostile environment. For example, recorder 28 may receive measurements from mud pulse telemetry sensor 14B functioning as a measurement tool to receive data via telemetry methods through the mud channel in real time or close to real time. Such data may be of limited quantities due to the low bandwidth communication channel of the mud channel. The outputs of receivers within tool 30 may be sent to recorder 28 for signal storage, for association of sonic receiver outputs with respective depth levels in drilling well 6. Recorder 28 may include a magnetic storage device such as a tape or disk or other storage media, including semiconductor or other type of memory circuits. A typical drilling well 6 may be several thousands of feet deep and the tool 30 may produce many millions of digitized measurements. Accordingly, recorder 28 may be a robust and high capacity storage unit appropriate for storing millions of measurements.

Figure 2:
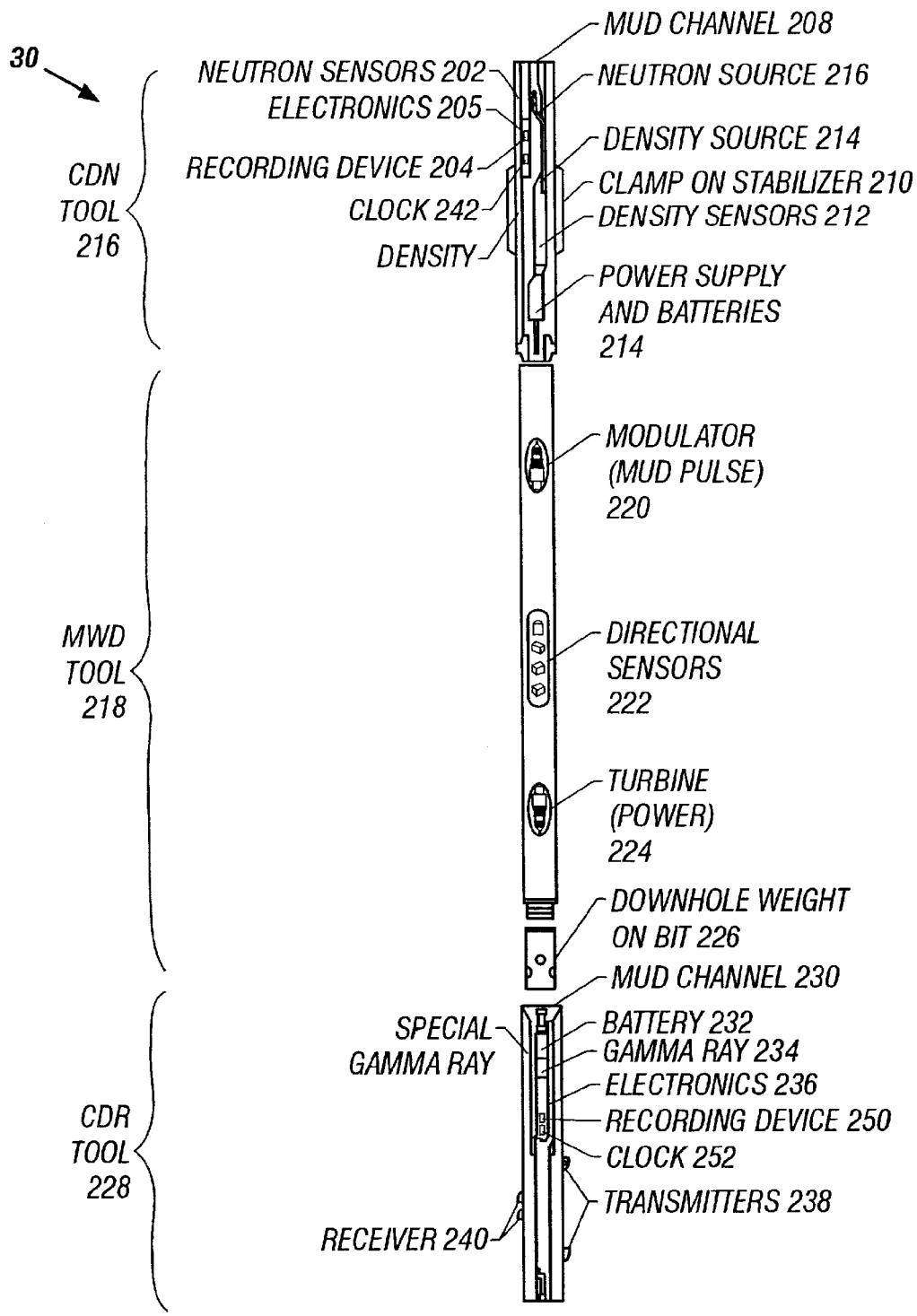
FIG. 2 illustrates a logging tool in accordance with an embodiment of the present invention.

Referring to FIG. 2, a more specific view of the tool 30 is shown. The tool includes equipment according to an embodiment of the present invention appropriate for logging while drilling (LWD) and measurement while drilling (MWD), as design requirements may dictate. As shown, tool 30 includes three portions, each of which may be included or excluded from the tool, as measurement system requirements require. A tool 30 may include a compensated dual resistivity tool (CDR) or other type of resistivity tool 228, a measurement-while-drilling (MWD) tool 218, a compensated density neutron (CDN) tool 216, as well as other known specific measurement type tools. Each of the CDR, MWD and CDN type tools, as chosen are coupled together to form tool 30. Specifically, a CDN tool 216 includes neutron sensors 202 a neutron source 215, a density source 214, clamp on stabilizers 210, density sensors 212 and power supply and batteries 215. The CDN tool 216 further provides a mud channel 208 that allows mud to flow through the tool 30. CDN tool 216 further includes electronics 205, including recording device 204 and clock 242.

The CDN tool may be coupled above an MWD tool 218. MWD tool 218 includes a modulator 220 for transmitting via the mud channel 208, directional sensors 222 configured to triangulate the location of tool 30 and a turbine 224 configured to provide power to the tool 30. MWD tool 218 further includes a downhole weight for a bit 226, which includes torque sensors. The MWD tool 218 may be coupled to a CDR tool 228. CDR tool 228 is shown including a mud channel 230 that flows through the tool 30, battery 232, gamma ray equipment 234 electronics 236 transmitters 238 and receivers 240. As one of skill in the art appreciates, the number of transmitters and receivers is according to design requirements. Electronics 236 includes a recording device 250 coupled to a clock 252. CDR tool 228 or the MWD tool 218, determined according to the configuration chosen for the tool 30, are coupled to a motor and a drill bit configured to drill in the formation 36.

LWD tools, which include CDN tool 216 and CDR tool 228 and MWD tool 218 provide measurements that indicate a hole trajectory and provide drilling mechanics measurements in real time. LWD measurements provide resistivity, neutron, density and gamma ray measurements in real time. Thus, MWD and LWD type measurements minimize drilling costs by providing measurements during a drilling procedure. A further benefit of LWD and MWD is that the measurements stored in recording devices 204 and 250, may be combined with wireline logs for a complete evaluation of the formation 36.

Referring back to FIG. 1, according to an embodiment, the MWD and LWD tools shown in FIG. 2 collect data in tool 30 and send the data in real time via mud pulse telemetry methods. More particularly, measurements may be made as needed by a driller by starting mud pumps 15. Typically, in MWD and LWD systems the investigating tool is incorporated into a drill collar or drill string and must, therefore, be able to withstand the immense forces and accelerations encountered while drilling the borehole. During drilling, mud is circulated through the drill bit via the drill string including the collars, MWD tools and LWD tools. The mud is necessary for many reasons, including clearing debris from a drill bit, maintaining pressure on a formation to insure fluid isolation of independent zones. The pressure differential between the inside and the outside of the drill collar may be several thousand psi, thereby creating a hostile environment for any clocks within the tool 30. The hostile environment is generally caused by two factors: high temperature and high shock. The pressure also causes a hostile environment. In some embodiments, the hostile environment within the tool 30 may be different even within the same tool. Thus, a plurality of clocks with the tool 30 may be subject to different hostile environments.

For LWD and MWD, mud pulse telemetry methods are used to send data to surface receivers. One mud pulse telemetry method includes a positive mud pulse wherein intermittent pressure increases at the standpipe by reducing the flow inside collars of a well 6. Another mud pulse telemetry method includes the negative mud pulse wherein intermittent pressure decreases at the standpipe by diverting a small flow to the annulus. A third mud pulse telemetry method includes using a continuous mud wave or "siren" transmission. More particularly, a siren system of transmission includes changing the phase of a modulated frequency signal and detecting these changes at the surface. This method allows measurements to be continuously transmitted to the surface. Other mud pulse communication methods are possible and within the scope of the present invention.

According to an embodiment, in each of the above mud pulse methods for LWD and MWD, measurement data is transmitted in real-time through the mud column and received at recorder 28 coupled to clock 34. The clock 34 provides a time stamp. In one embodiment, the record rate of the mud communication channel 208 is approximately 30 seconds. One of skill in the art, however, appreciates that the record rate depends on a variety of conditions, such as the mud pulse method chosen and properties of the formation.

The sensor within tool 30 that collects data and transmits the data in real time via the mud communication channel 208 and 230, as required, also records the data in the tool 30 in recording device 250 for CDR tool 228 and recording device 204 for CDN tool 216. Further, the data from the sensors, such as density sensors 212 and receivers 240, also transmit the data to a recording device, such as recording device 204 in CDN tool 216 and recording device 250 in CDR tool 228 with time stamping from the clocks 242 and 252, respectively. In another embodiment, the recording devices 250 and 204 may be combined to one recording device for tool 30, and the clocks 242 and 252 may also be combined. The record rate in the tool 30 is faster than the record rate via the mud communication channel due to the noise interference with the mud communication channel. Without requiring transmission through the mud, the measurements taken by the sensor may be, for example, every five seconds, depending on system requirements. The measurements recorded in the tool provide more data due to the faster record rate, or sampling rate, as the case may be. In some embodiments, measurements taken in the tool are from one or more sensors within the tool using one or more additional channels that may or may not be transmitted via the mud communication channel. The measurements not transmitted may, however, be recorded in the tool 30. In one embodiment, each clock in tool 30 is synchronized, each providing a time stamp. Thus, the time stamping the measurements not transmitted via the mud communication channel may later be combined with a plurality of mud channel measurements synchronized to each other.

In another embodiment, the tool 30 shown in FIG. 2 is one of a plurality of tools in a same or similar hostile environment. Thus, each tool 30 may have one or more recording devices and clocks therein. In the embodiment, each clock within each tool 30 is synchronized with each other, or, in the alternative, each clock is synchronized with at least one clock outside of the hostile environment. Thus, there could be one or two sets of data that may be later correlated to provide enhanced measurements.

The benefit of the combining the mud channel measurements with the downhole-recorded measurements is tempered due to the hostile environment in which the clock and/or plurality of clocks operate. For example, a clock within a tool may stop for a length of time or drift with respect to the clock at the surface.

Figure 3:
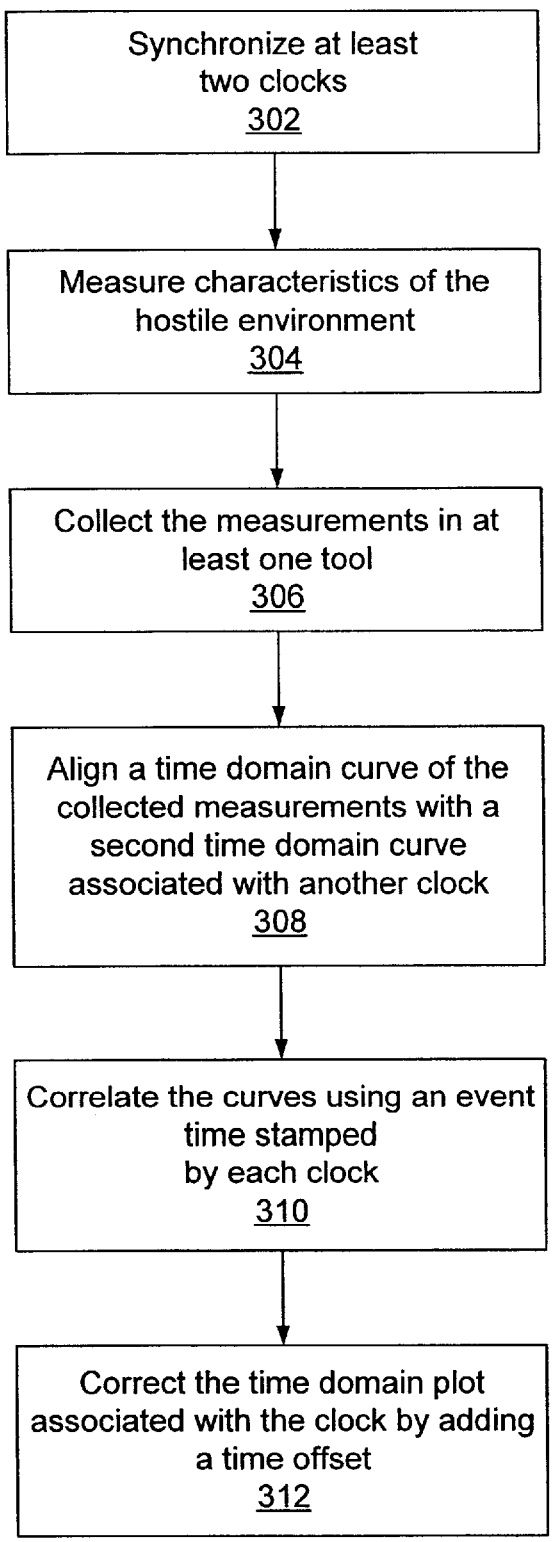
FIG. 3 is a flow diagram of a method in accordance with an embodiment of the present invention.

Referring now to FIG. 3, a method describes aligning measurements for a hostile environment. Block 302 provides for synchronizing at least two clocks. In an embodiment, at least one of the two clocks is in the hostile environment. A hostile environment, for this purpose, includes a logging while drilling environment, a high pressure environment, and any environment wherein a clock therein may be subject to pauses, drifts, or any number of malfunctions. Accordingly, a hostile environment for purposes of the present invention is defined as any environment for which a clock is subject to malfunction. As such, the extent to which an environment is hostile is a function of the robustness of the clock. In one embodiment, the hostile environment includes one of a borehole environment, an environment with high environment pressures, and an environment wherein clock measurements are subject to error. Block 304 provides for measuring characteristics of the hostile environment. The measured characteristics of the hostile environment may include statistical and non-statistical measurements such as depth, resistivity, nuclear measurements, and the like.

Block 306 provides for collecting the measurements in at least one tool, wherein at least one of the tools includes a recording device coupled to a clock. The at least one tool may include any tool including a recording device and a clock. For example, referring to FIG. 2, the tool may include a CDN tool 216, an MWD tool 218 and a CDR tool 228, according to design specifications. Block 308 provides for aligning a time domain curve of the collected measurements with a second time domain curve associated with another clock. The another clock may be within the tool and also in a hostile environment or at a non-hostile environment, such as a surface location.

Block 310 provides for correlating the curves using at least one of an accurately timed event by each clock and a discovered event recorded by each clock. More particularly, in an embodiment, a user may view a time domain plot of each recorded measurement and identify events that should occur or have occurred at the same time. The viewing may be done automatically by prearranging an event. For example, in a logging while drilling environment, if the tool is stationary, a depth measurement should not change of the length of time for which the tool is stationary. If the time for which the tool is stationary is prearranged, the event on a time domain plot can be compared with recorded measurements. Other examples may include a known timed resistivity measurement, a torque measurement or any other measurement with variables for which the derivative of the measurement taken with respect to time and provides a constant. In an embodiment, the accurately timed event includes a purposeful change in the position of a measurement tool that is recorded by both the measurement tool and a second recording device. In the embodiment for which two tools 30 are each in a same or similar hostile environment, the prearranged event may include an rotation giving a rotation per minute (RPM) measurement the two or more tools 30, such as in logging while drilling (LWD). Thus, each LWD tool may be rotating at the same time, giving parameters allowing correction of any clocks. In this embodiment, a determination may be made as to a more accurate clock to which to compare data.

Block 312 provides for correcting the time domain plot associated with the clock by adding a time offset. The time offset is added according to a reset indicator. A reset indicator indicates a point in a time domain curve as to when a reset event occurred. A reset event includes an event for which a clock stops, drifts, or otherwise malfunctions such that a comparison between at least two time domain curves of related data show a mismatch. The correcting may be automatic, as in the case of a prearranged timed event. Alternatively, the correcting may be user manipulated, as in the case of a late discovered timed event. The time offset may be a differential measurement. In an embodiment, the correcting includes applying corrections and creating, for example, a correct depth indexed log using both measurements. In one embodiment, the correcting is repeated as needed to correct multiple clock problems. For example, in a clock drift example, a plurality of time offsets may be made to correct the drift by discretizing the plots to be compared and corrected.

In an embodiment, block 302 is not performed, rather, blocks 304 through 310 are performed to determine whether clocks were correctly synchronized, block 312 being performed in the event of a discovered synchronization failure.

Blocks 304 through 310 may be performed as a check of the clocks and/or the system. In such a case, a reset indicator would not necessarily be required for adding a time offset. For example, a synchronization problem may indicate that clocks were not correctly aligned at the beginning of data collection. Accordingly, a time offset may be added from a beginning point or another appropriate point on a time domain curve.

In one embodiment, blocks 304 through 310 are performed to validate that the clocks are aligned. If the curves correlate in block 310, then block 312 is not necessary. By performing blocks 304 through 310 with every data set, the data set can either be validated or invalidated, which may require further correction of the data.

In one embodiment, the method described in FIG. 3, or at least a part thereof, is performed by software. In this embodiment, data from for example a bit run are loaded into the program. In this embodiment, the program receives data from measurements in the hostile environment, wherein the measurements are from at least two recording devices with synchronized clocks, wherein at least a first clock is in the hostile environment. Using the data, the program may create time domain curves of the measurements. Alternatively, a different software program or module may create the time domain curves and pass them to the program. The program aligns time domain curves of the collected measurements in, for example, a software module. In one embodiment, the program includes a module that correlates the curves using one or more events recorded by each clock. In another embodiment, the program provides for user input to identify one or more events recorded by each clock. After the events are identified, the program corrects the curves by adding one or more time offsets according to the events identified. For example, if identified events do not line up appropriately according to the time determined to be accurate, the program adds one or more time offsets to correct the curves.

Figure 4:
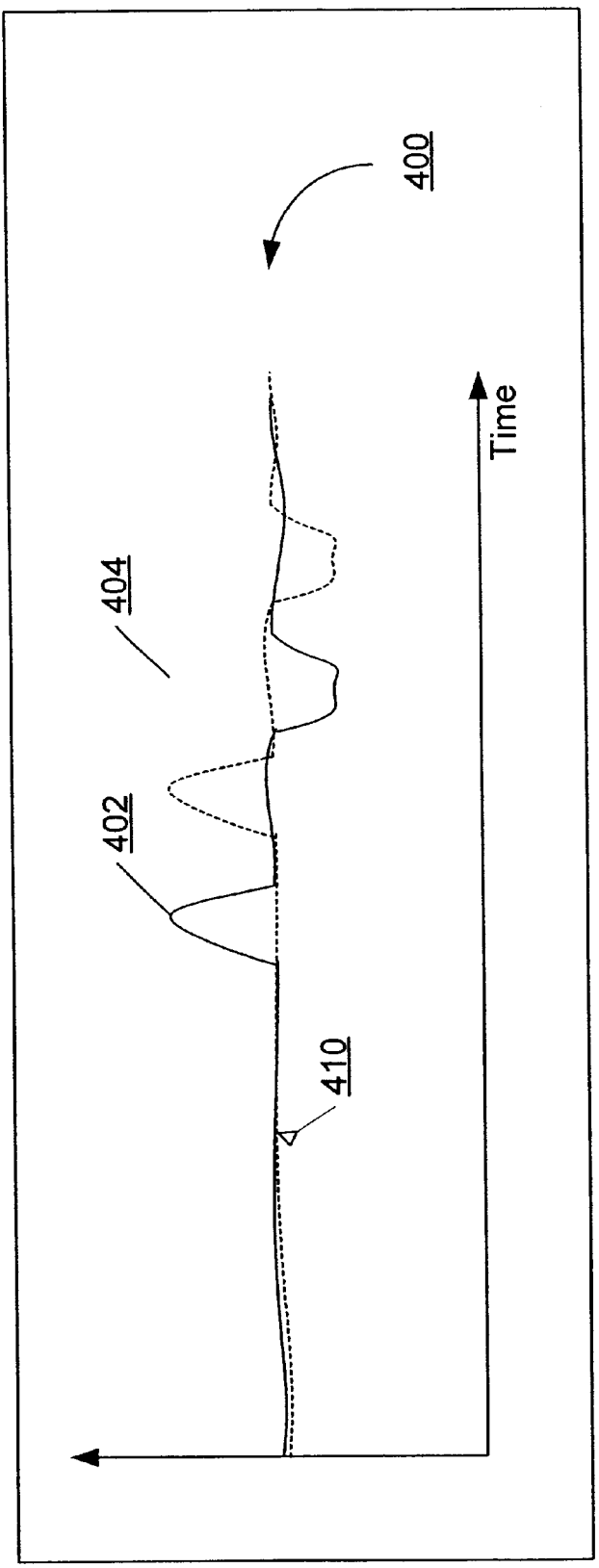
FIG. 4 is a plot illustrating two time domain curves representing two sets of recorded measurements from a first recording device and a second recording device in accordance with an embodiment of the present invention.

FIG. 4 illustrates a plot 400 according to an embodiment of the present invention. Plot 400 shows two measurements from a same sensor, plotted against time. A first curve, 402 provides data recorded in a tool, such as tool 30 with time indexed according to one of the downhole clocks 242 and 252. A second curve 404 provides data from a recording device receiving measurements transmitted through the mud communication channel that receive a time stamp at surface. The second curve 404 could also represent data from a recording device in a second tool in the same or similar hostile environment, or a different recording device and clock within the same tool.

FIG. 4 further shows indicator 410, which represents an indication of a reset event. More particularly, a reset event may include a downhole clock malfunction causing a time shift. The moment a malfunction occurs will be known to have happened at a particular time. For example, referring to curves 402 and 404, one skilled in the art will appreciate that the event occurred when the curves diverge. Other techniques for discovering the malfunction include a time set on a malfunctioning clock and time-stamped signals upon a reset event. When a downhole clock malfunctions, it stops for a period of time.

Figure 5:
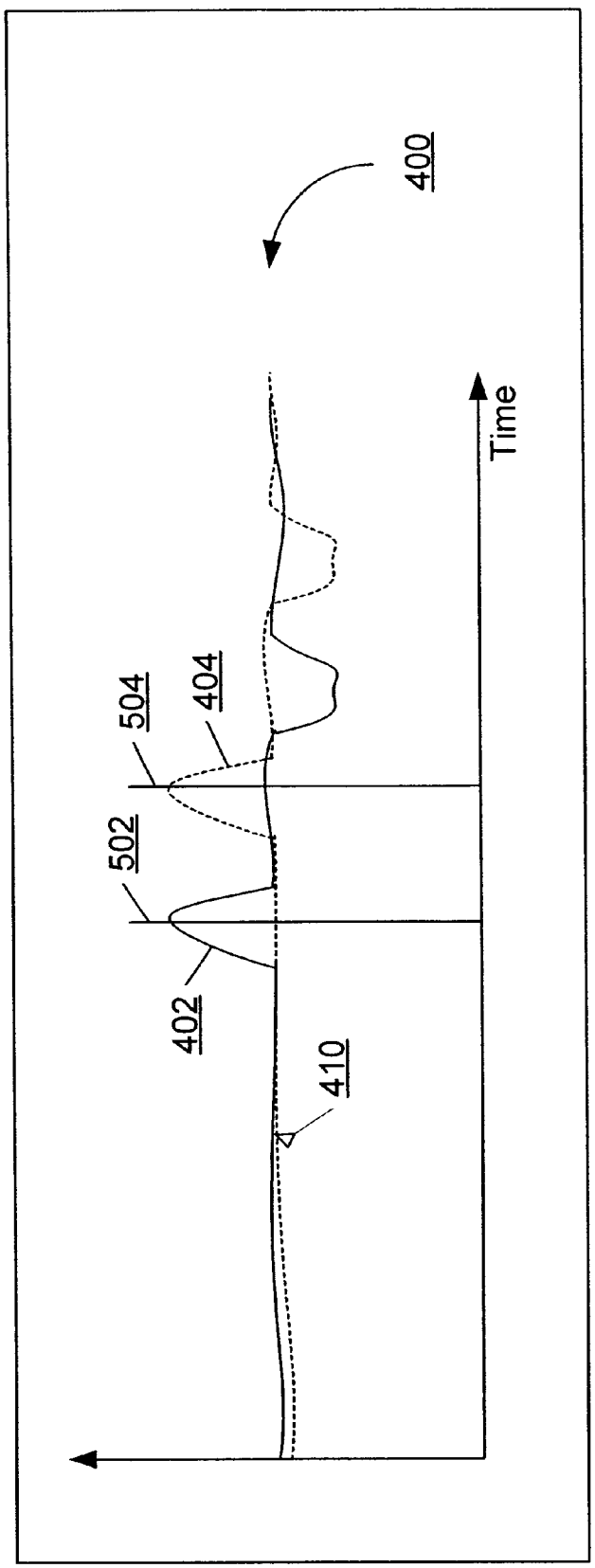
FIG. 5 is a plot illustrating two time domain curves with a timed event identified in each curve in accordance with an embodiment of the present invention.

Referring to FIG. 5, the curves 402 and 404 are plotted together, and a time difference or plurality of differences between the clocks located as shown with lines 502 and 504. The differences can be determined using an automatic procedure, such as a computer program, or can be identified manually. Once the differences are established, the time offset or offsets applied to the data correct the plots to provide more accurate measurements.

Figure 6:
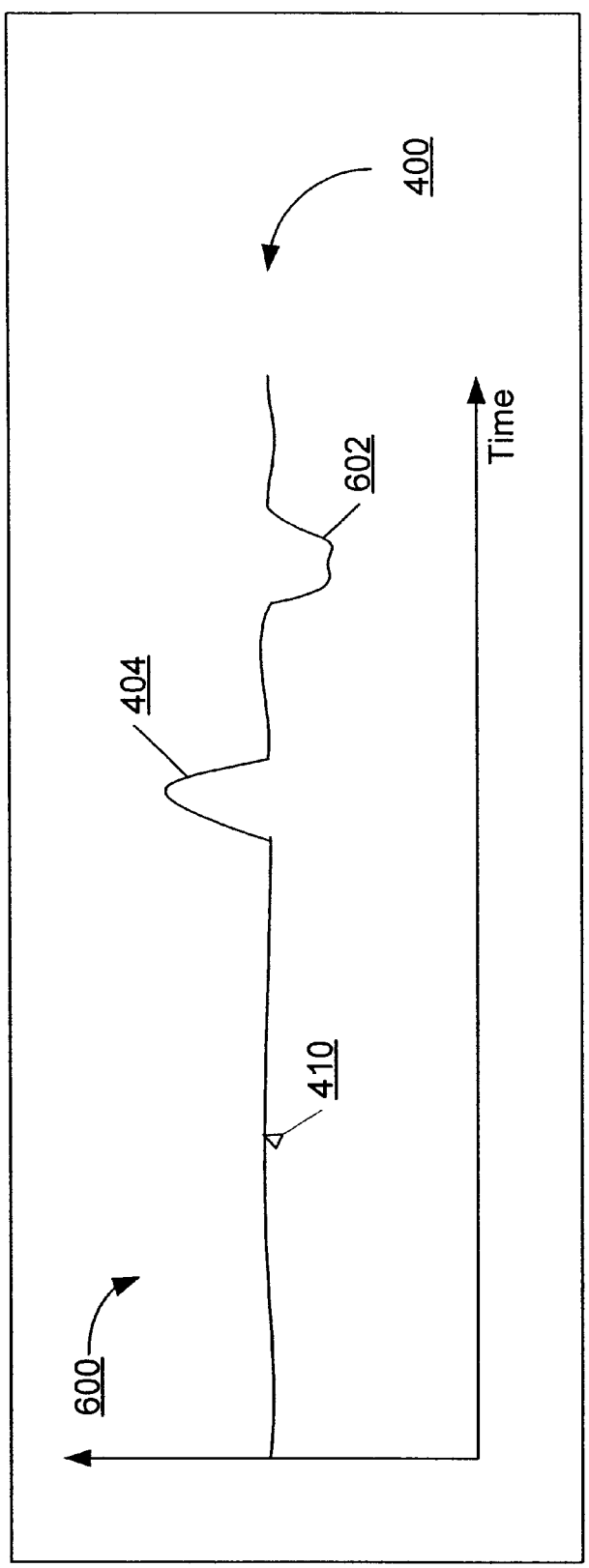
FIG. 6 is a plot illustrating corrected time domain curves in accordance with an embodiment of the present invention.

FIG. 6 illustrates a plot 600 after repair by adding a time offset to the curve that requires an offset to a temporary stopping or the like. According to an embodiment, each time offset is added at an appropriate indicator, such as indicator 410. There may be one or a plurality of indicators and associated time offsets for a curve.

More particularly, plot 600 includes a curve 404 as shown in FIG. 4, and a curve 602. Curve 602 includes one or more time offsets as calculated by finding the differences between the curves. As shown, with the time offsets determined and added to a corresponding indicator such as indicator 410, the curves match, thereby providing additional data to the plot 600.

Although particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. For example, the techniques presented may be appropriate for a plurality of hostile environments as defined herein. As discussed, the hostility of the environment is a function of the robustness of the clock. Therefore, environments for which a clock is efficiently produced without regard to durability may be appropriate for the present invention. Such environments may include underwater environments for which measurements are recorded in a plurality of locations. For example, a tool appropriate for the embodiments presented may include an underwater tool for measuring characteristics of an underwater environment, such as coral reefs, schools of fish, underwater measurements of earth formations and the like. Also, another appropriate environment may be an outer space environment for which measurements are recorded in a plurality of locations.

What is claimed is:

1. A method for aligning measurements of a hostile environment, the method comprising:
    measuring characteristics of the hostile environment as a function of time thereby producing a first time domain curve recorded versus the clock in the hostile environment;
    transmitting the measured characteristics from the hostile environment to a second environment, thereby collecting a second time domain curve at the second environment record versus the clock in the second environment;
    after the measurements have been completed aligning time domain curves of the collected measurements, by:
        identifying at least one event present in both the first and second time domain curve;
        correlating the curves using one or more events recorded by each clock; and
        correcting the curves by adding one or more time offsets.

2. The method of claim 1 wherein each of the one or more time offsets are added to a corresponding reset indicator.

3. The method of claim 2 wherein the reset indicator indicates a clock event causing degradation of the curves due to the hostile environment.

4. The method of claim 1 wherein a second clock is located outside the hostile environment.

5. The method of claim 1 wherein a second clock is located within a same or similar hostile environment.

6. The method of claim 1 wherein:
    a first clock is located within the hostile environment and coupled to a first measurement tool within the hostile environment, the first measurement tool measuring characteristics of the hostile environment; and
    a second clock is located outside the hostile environment and coupled to a first sensing tool that is outside the hostile environment, the first sensing tool receiving measured characteristics of the hostile environment.

7. The method claim 1 further collecting the measurements taken by a first measurement tool associate with the first clock and in at least a second measurement tool associated with a second clock.

8. The method of claim 7 wherein the collecting the measurements includes transmitting the measurements to the second measurement tool via a slow communication channel.

9. The method of claim 8 wherein the slow communication channel is a mud communication channel, and the first measurement tool includes at least a first device, the first device collecting the measurements via a faster communication channel than the slow communication channel.

10. The method of claim 1 wherein the correcting is according to a differential measurement of the curves associated with each clock.

11. The method of claim 1 wherein the correlating an event includes one or more of an accurately timed event by each clock and a discovered event recorded by each clock.

12. The method of claim 11 wherein the accurately timed event includes a purposeful change in the position of a first measurement tool that is recorded by both the first measurement tool and a device associated with a second clock.

13. The method of claim 1 wherein the hostile environment includes one or more of a borehole environment, an environment with high environment pressures, and an environment wherein clocks are subject to error.

14. The method of claim 1 wherein the measurement tool includes one or more of a sonde, a logging while drilling tool, and a measurement while drilling tool.

15. The method of claim 1 further comprising:
    collecting data in at least a first and a second measurement tool wherein the second measurement tool and the first measurement tool provide measurements, the measurements providing additional data with which to correct the aligning of the curves.

16. The method of claim 1 wherein the collecting the measurements includes plotting data from a first measurement tool and from a device coupled to a second clock, wherein the plotting includes determining a value for a characteristic with respect to a time value.

17. The method of claim 16 wherein the correcting includes finding the differential measurement by comparing plots.

18. A system for aligning measurements of a hostile environment, the system comprising:
    a measurement tool configured to measure characteristics of the hostile environment as a function of time, the measurement tool including at least a first recording device coupled to a first clock and operable to record the measured characteristics as a first time domain curve versus time measurements according to the first clock; and
    a second recording device coupled to a second clock, the second recording device being configured to receive measurements from the measurement tool and to record the measured characteristics as a second time domain curve versus time measurements according to the second clock wherein:
        the time domain curves are aligned and correlated after the measurements have been completed by identifying at least one event present in both the first and second time domain curve; and
    the time domain curves are corrected by adding one or more time offsets.

19. A method for aligning measurements of a hostile environment, the method comprising:
    receiving the measurements recorded by at least a first and a second recording device wherein at least the first recording device is disposed in the hostile environment;
    aligning time domain curves of the collected measurements after the measurements have been completed, by:
        identifying at least one event present in both the time domain curve of the first recording device and in the time domain curve of the second recording device;

correlating the curves using one or more events recorded by at least the first and second recording devices; and correcting the curves by adding one or more time offsets.

20. The method of claim 19 wherein each recording device is coupled to a clock the clock providing a time stamp on the recorded measurements, wherein at least one of the clocks is within the hostile environment and subject to error.

21. A method for aligning measurements of a hostile environment, the method comprising:

providing at least two clocks, wherein at least a first clock is in the hostile environment;

measuring characteristics of the hostile environment and recording the characteristics as a time domain curve versus time recorded by each of the at least two clocks;

after the measurements have been completed aligning time domain curves of the collected measurements recorded versus each of the at least two clocks, by:

correlating the curves using one or more events identified in the time domain curves recorded by each clock; and if the curves do not correlate, correcting the curves by adding one or more time offsets.

22. The method of claim 21 wherein the method is performed as a validation of the measured characteristics of the hostile environment.

23. The method of claim 21 wherein the correcting the curves synchronizes the time domain curves after a failure to synchronize the at least two clocks.

24. A computer program product comprising:

an input/output object operable to receive measurements recorded by at least a first and a second recording device and to produce a first and a second time domain curve each recorded versus a time measurement taken by a first and a second clock, respectively, wherein at least the first recording device is disposed in a hostile environment;

an alignment object coupled to the input/output object the alignment object operable to align time domain curves of the collected measurements after the measurements have been completed by measuring:

a correlation object coupled to the alignment object, the correlation object operable to correlate the curves using one or more events recorded by at least the first and second recording device; and a correction object coupled to the correlation object, the correction object operable to correct the curves by adding one or more time offsets, the correction object adding the one or more time offsets to the curves at a reset indication.

25. The computer program product of claim 24 wherein the reset indication indicates a malfunction of a clock associated with one of the recording devices, the malfunction causing an error in the time domain curves.

26. An apparatus configured to align time stamped measurements of a hostile environment recorded by at least two recording devices coupled to at least two synchronized clocks wherein at least a first clock is in the hostile environment, the apparatus comprising:

means for measuring characteristics of the hostile environment;

means for recording the measured characteristic versus time measurements of the first clock thereby producing a first time domain curve;

means for recording the measured characteristic versus time measurements of a second clock thereby producing a second time domain curve;

means for aligning time domain curves of the collected measurements after the measurements have been completed by invoking:

means for correlating the curves using one or more events recorded by each clock; and means for correcting the curves by adding one or more time offsets.

* * * * *

UNITED STATES PATENT AND TRADEMARK OFFICE
CERTIFICATE OF CORRECTION

PATENT NO.   : 6,618,674 B2
DATED        : September 9, 2003
INVENTOR(S)  : Ireland et al.

It is certified that error appears in the above-identified patent and that said Letters Patent is hereby corrected as shown below:

<u>Title page,</u>
Item [*] Notice, change "the term of this patent is extended or adjusted under 35 U.S.C. 154(b) by 0 days." to -- the term of this patent is extended or adjusted under 35 U.S.C. 154(b) by 38 days. --
Item [56], References Cited, U.S. PATENT DOCUMENTS, change "6,023,441 A 2/2000 McDaniel" to -- 6,023,444 A 2/2000 Naville et al. --

Signed and Sealed this

Sixteenth Day of December, 2003

JAMES E. ROGAN
*Director of the United States Patent and Trademark Office*